United States Patent
Grossman (10) Patent No.: US 10,504,106 B2
(45) Date of Patent: Dec. 10, 2019

(54) METHODS, SYSTEMS, NETWORKS, AND MEDIA FOR TRANSFERRING DATA STREAMS THROUGH VIBRATION TO HAPTIC DEVICES

(71) Applicant: MASTERCARD INTERNATIONAL INCORPORATED, Purchase, NY (US)

(72) Inventor: David Grossman, Brooklyn, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 610 days.

(21) Appl. No.: 15/219,097

(22) Filed: Jul. 25, 2016

(65) Prior Publication Data
US 2018/0025350 A1    Jan. 25, 2018

(51) Int. Cl.
*G06Q 20/36* (2012.01)
*G06Q 20/20* (2012.01)
*G06Q 20/32* (2012.01)

(52) U.S. Cl.
CPC .......... *G06Q 20/36* (2013.01); *G06Q 20/202* (2013.01); *G06Q 20/327* (2013.01)

(58) Field of Classification Search
None
See application file for complete search history.

(56) References Cited

U.S. PATENT DOCUMENTS

| | | | |
|---|---|---|---|
| 6,213,392 B1* | 4/2001 | Zuppicich | G06K 7/0004 235/375 |
| 2002/0074401 A1* | 6/2002 | Madani | G06K 7/084 235/449 |
| 2006/0022033 A1* | 2/2006 | Smets | G06Q 20/32 235/380 |
| 2008/0054078 A1* | 3/2008 | Tanner | G06K 19/07345 235/492 |
| 2015/0145656 A1* | 5/2015 | Levesque | G06F 1/163 340/407.1 |
| 2015/0348009 A1* | 12/2015 | Brown | G06Q 20/3227 705/16 |
| 2016/0260088 A1* | 9/2016 | Olson | H04W 76/10 |

* cited by examiner

*Primary Examiner* — Paul Danneman
(74) *Attorney, Agent, or Firm* — Baker Botts L.L.P.

(57) ABSTRACT

A method for performing a point of sale transaction can include determining that a mobile payment device is within a predetermined distance of a merchant terminal. The processor of the mobile payment device can obtain digital wallet information associated with the user of the mobile payment device. The processor can generate a plurality of pulses from the digital wallet information. The plurality of pulses can encode payment card information expected by the merchant terminal for the point of sale transaction. The processor can instruct a haptic actuator of the mobile payment device to generate a plurality of tactile pulses such that each tactile pulse of the plurality of tactile pulses corresponds to a pulse of the plurality of pulses.

20 Claims, 6 Drawing Sheets

METHODS, SYSTEMS, NETWORKS, AND MEDIA FOR TRANSFERRING DATA STREAMS THROUGH VIBRATION TO HAPTIC DEVICES

BACKGROUND

The disclosed subject matter relates to methods, systems, networks, and media for transferring data streams through vibration to haptic devices.

With the proliferation of mobile internet connected devices, customers are more likely to have a mobile internet connected device of some form on their person at all times than their credit or debit cards. With advances in digital wallet technology, it is becoming increasingly common for consumers to wish to store their financial information in a digital wallet on their mobile internet connected device. Currently, mobile devices are used in conjunction with near field communication (NFC) techniques to facilitate point of sale (POS) transactions. However, NFC carries great security risks. Since NFC payments require the payment to be performed wirelessly, attackers have developed methods to mimic NFC enabled payments terminals and gain unauthorized access to consumers' personal, social security and financial data stored on their NFC-enabled mobile payment devices. The lack of security afforded by NFC communications could discourage both consumers and merchants from using digital wallet technology.

Advances in haptic technology and pressure sensitive electronic devices such as tablets have allowed electronic communication between devices through vibration. Such a form of communication between devices offers a more secure method for exchanging information. Accordingly, there exists a need for improved techniques for transferring digital wallet data to haptic devices through vibration.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, a method for performing a point of sale transaction is disclosed. The method can include determining, by a processor of a mobile payment device, that the mobile payment device is within a predetermined distance of a merchant terminal. The processor can obtain digital wallet information associated with a user of the mobile payment device. The processor can generate a plurality of pulses from the digital wallet information, wherein the plurality of pulses encodes payment card information expected by the merchant terminal for the point of sale transaction. The processor can instruct a haptic actuator of the mobile payment device to generate a plurality of tactile pulses such that each tactile pulse of the plurality of tactile pulses corresponds to a pulse of the plurality of pulses.

For purpose of illustration and not limitation, the digital wallet information can include payment card information, user identification information, authentication information, token information, and reward information.

For purpose of illustration and not limitation, generating the plurality of pulses can include determining a data format of the tactile pulses that the merchant terminal expects to receive. The merchant terminal can be configured to convert the tactile pulses output by the haptic actuator of the mobile payment device into digital wallet information. Additionally or alternatively, the processor can generate the plurality of pulses according to the determined data format from the digital wallet information. For purpose of illustration and not limitation the data format of the tactile pulses that the merchant terminal expects to receive can include binary data, hexadecimal data, octal data, binary-coded hexadecimal data, binary-coded decimal data. For example and not limitation, an amplitude of each tactile pulse in the plurality of tactile pulses can be determined based on the data format of the tactile pulses that the merchant terminal expects to receive.

As embodied herein, the mobile payment device can include one or more sensors configured to determine when the mobile payment device is within the predetermined distance of the merchant terminal. Upon detecting that the mobile payment device is within the predetermined distance of the merchant terminal, the mobile payment device can initiate transmission of the tactile pulses (e.g., begin pulsating) to conduct a transaction with a merchant terminal. Additionally or alternatively, the haptic actuator can be located at an edge of a surface of the mobile payment device. Additionally or alternatively, the mobile payment device can include a button that a user can press to trigger the mobile payment device to initiate transmission of tactile pulses to conduct a transaction with a merchant terminal.

As embodied herein, the processor of the mobile payment device can receive, from the merchant terminal, a message indicating that at least one tactile pulse of the plurality of tactile pulses received by the merchant terminal falls below a predetermined noise threshold. Additionally or alternatively, such a message can indicate that the merchant terminal has received an improperly encoded message from the mobile payment device. In such an event, the processor can perform one of several different signal correction techniques. In one exemplary implementation, the processor can instruct the haptic actuator of the mobile payment device to generate the plurality of tactile pulses having a higher pressure amplitude than tactile pulses previously transmitted to the merchant terminal. In another exemplary implementation, the processor can instruct the haptic actuator of the mobile payment device to retransmit the plurality of tactile pulses that were previously transmitted to the merchant terminal. In another exemplary implementation, the processor can instruct the haptic actuator to generate the plurality of tactile pulses having a different pulse rate than that of the tactile pulses previously transmitted to the merchant terminal. In another exemplary implementation, the processor can instruct the haptic actuator to generate the plurality of tactile pulses having a different pulse format and/or gradations than that of the tactile pulses previously transmitted to the merchant terminal.

As embodied herein, the mobile payment device can determine that the merchant terminal does not include a pressure sensitive reader and instead includes alternative methods of signal input such as a magnetic stripe reader. Accordingly, the processor can generate, using the digital wallet information, electromagnetic pulses corresponding to the payment card information encoded in magnetic tracks of a traditional payment card expected by the magnetic stripe reader. The processor can instruct a transmitter of the mobile payment device to transmit the electromagnetic pulses to the magnetic stripe reader. For purpose of illustration and not limitation, in determining that the merchant terminal does not include a pressure sensitive reader and includes an alternative signal input device, the mobile payment device can wait to receive from the merchant terminal, within a predetermined amount of time, a first electronic message indicating that the merchant terminal includes the device and determine whether a second electronic message indicating a presence of the pressure sensitive reader was not received within the predetermined amount of time. Additionally or alternatively, the mobile payment device can receive an indication from the user of the mobile payment device that the merchant terminal includes the magnetic stripe reader and does not include the pressure sensitive reader. Additionally or alternatively, the mobile payment device can determine that the merchant terminal includes the magnetic stripe reader and does not include the pressure sensitive reader by processing an image of the merchant terminal captured by an image capture device associated with the mobile payment device.

For purpose of illustration and not limitation, the plurality of tactile pulses can encode authentication information, token information, and other security information on a different software layer than the payment card information expected by the merchant terminal. As embodied herein, the mobile payment device can instruct the merchant terminal to convert the plurality of tactile pulses received from the mobile payment device into decoded payment information. Such decoded payment information can be used to process the point of sale transaction and can include a message comprising the authentication information, token information, and other security information received on a different software layer than the payment card information. For purpose of illustration and not limitation, the message can be transmitted to an issuer of the payment card to authenticate the point of sale transaction.

In accordance with another aspect of the disclosed subject matter, a mobile apparatus for performing a POS transaction is disclosed. The mobile apparatus can include at least one haptic actuator and a processor, coupled to the haptic actuator. The processor can be configured to determine that the mobile apparatus is within a predetermined distance of a merchant terminal. The processor can obtain digital wallet information associated with a user of the mobile apparatus. The processor can generate a plurality of pulses from the digital wallet information, such that the plurality of pulses encode payment card information expected by the merchant terminal for the point of sale transaction. Each of these plurality of pulses can be converted into a tactile pulses to be transmitted by the mobile apparatus. For example, the processor can instruct the haptic actuator to generate a plurality of tactile pulses such that each tactile pulse of the plurality of tactile pulses corresponds to a pulse of the plurality of pulses. The format in which the pulses are to represent digital wallet information can be determined by the mobile apparatus. The mobile apparatus can transmit, to the merchant terminal, an indication of the format used to encode the pulses. The mobile apparatus can determine the format by several different methods. According to an exemplary implementation, the mobile apparatus can determine the format for encoding the digital wallet information into pulses by referring to a standard predetermined format. According to another exemplary implementation, the mobile apparatus can determine the format for encoding the digital wallet information into pulses by referring to a format that has been negotiated through bi-directional signals between the merchant terminal and the mobile apparatus and/or its connected proxies. According to another exemplary implementation, the mobile apparatus can determine the format for encoding the digital wallet information into pulses by determining the terminal type of the merchant terminal and consulting a registry of formats associated with different terminal types. According to another exemplary implementation, the mobile apparatus can determine the format for encoding the digital wallet information into pulses by trial and error (e.g., by attempting several different transmissions of pulses encoded according to different formats).

In some embodiments, the mobile apparatus can be capable of receiving signals initiated by the merchant terminal through various different means including Bluetooth and/or radio signals, physical vibrations emanating from the merchant terminal, light pulses, audio signals, magnetic feedback, and wired electronic signals.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

Throughout the drawings, the same reference numerals and characters, unless otherwise stated, are used to denote like features, elements, components or portions of the illustrated embodiments. Moreover, while the present disclosed subject matter will now be described in detail with reference to the figures, it is done so in connection with the illustrative embodiments.

DETAILED DESCRIPTION

Reference will now be made in detail to various exemplary embodiments of the disclosed subject matter, some of which are illustrated in the accompanying drawings. The structure and corresponding method of operation of the disclosed subject matter will be described in conjunction with the detailed description of the system.

The methods, systems, networks, and media presented herein can be used for performing POS transactions by exchanging payment information across electronic devices through vibrations.

Figure 1:
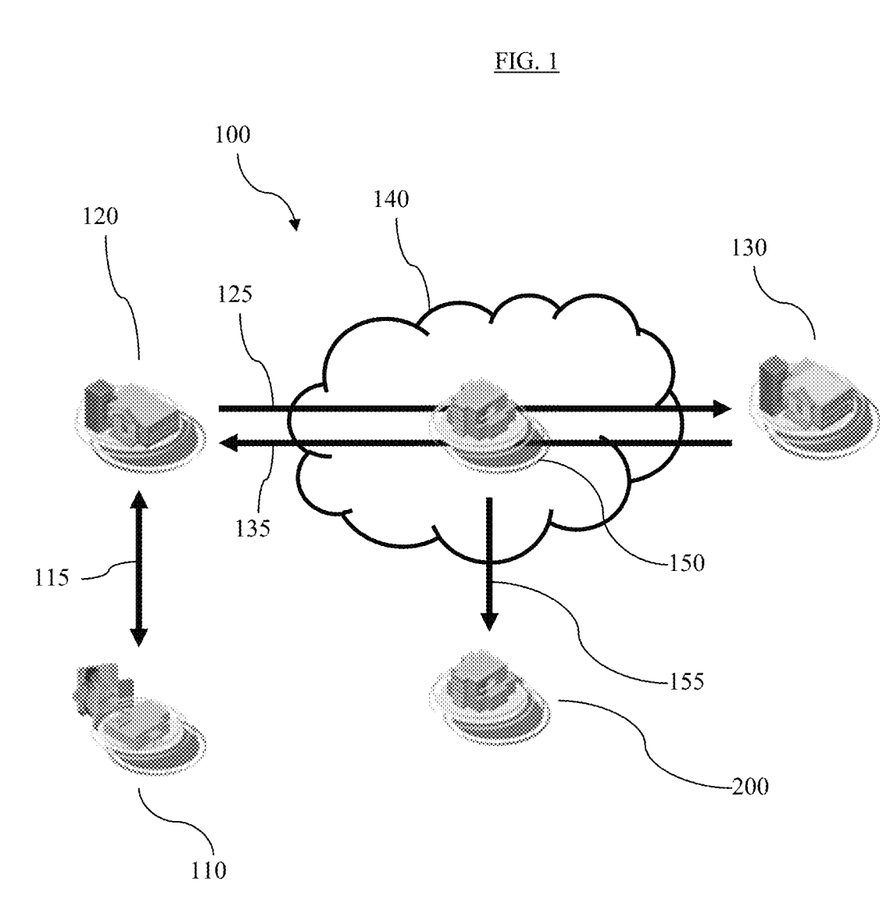
FIG. 1 is a diagram illustrating a representative payment network according to an illustrative embodiment of the disclosed subject matter.
Figure 2:
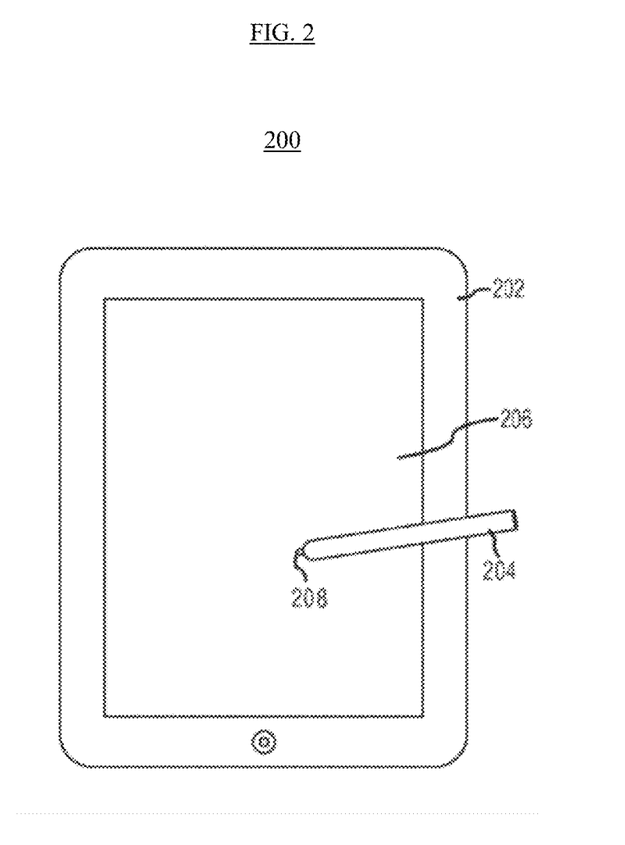
FIG. 2 is a diagram illustrating a representative POS system for transferring data across devices according to an illustrative embodiment of the disclosed subject matter.
Figure 3:
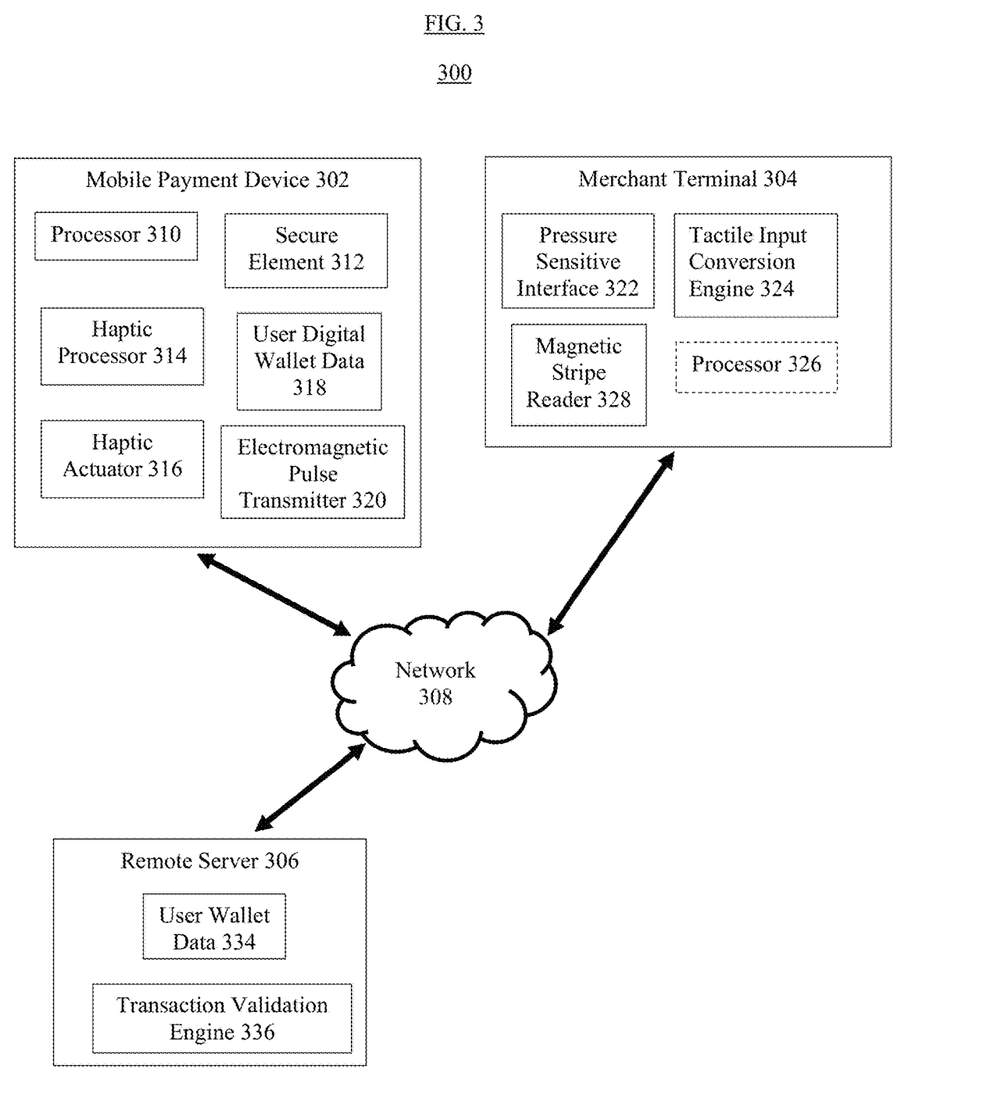
FIG. 3 is a block diagram illustrating a representative POS system according to an illustrative embodiment of the disclosed subject matter.
Figure 4:
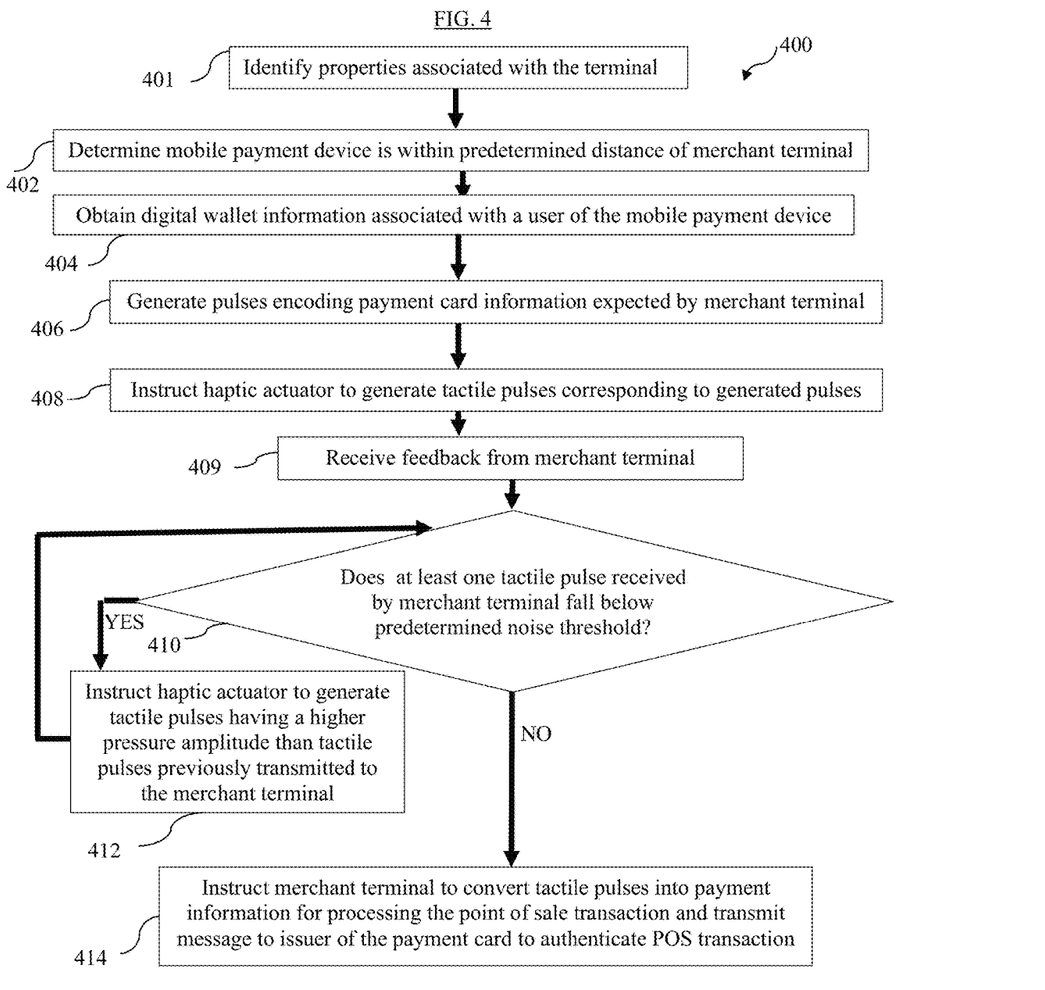
FIG. 4 is a flow chart illustrating a representative method, for transferring data across devices using tactile pulses, implemented according to an illustrative embodiment of the disclosed subject matter.
Figure 6:
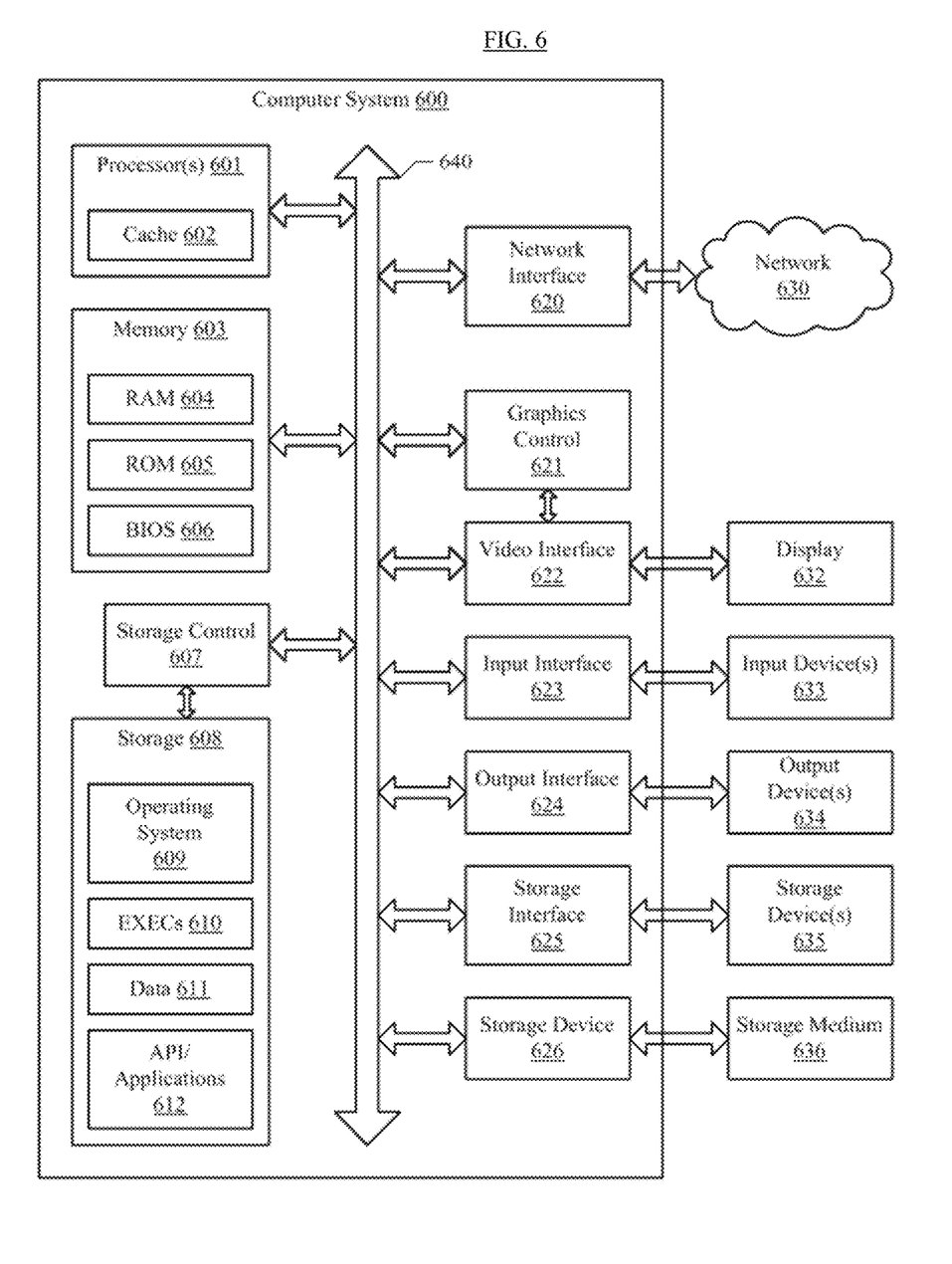
FIG. 6 is a block diagram illustrating further details of a representative computer system according to an illustrative embodiment of the disclosed subject matter.

The accompanying figures, where like reference numerals refer to identical or functionally similar elements throughout the separate views, further illustrate various embodiments and explain various principles and advantages all in accordance with the disclosed subject matter. For purpose of explanation and illustration, and not limitation, an exemplary embodiment of a payment networks for predicting acceptance of a commercial card product in accordance with the disclosed subject matter is shown in FIG. 1. An exemplary embodiment of a system for conducting a POS transaction between a mobile payment device and a pressure sensitive merchant terminal device in accordance with the disclosed subject matter is shown in FIG. 2. FIG. 3 shows an exemplary block diagram of the POS system for transferring data across a consumer mobile device and a merchant terminal through tactile input and/or vibration in accordance with the disclosed subject matter. FIG. 4 shows an exemplary embodiment of a method for predicting acceptance of a commercial card product in accordance with the disclosed subject matter. An exemplary embodiment of a computer system for use with the disclosed subject matter is shown in FIG. 6. While the present disclosed subject matter is described with respect to using methods, systems, networks, and media for performing a POS transaction between a mobile device and a pressure sensitive device using tactile input and/or vibration, one skilled in the art will recognize that the disclosed subject matter is not limited to the illustrative embodiments. For example, the methods, systems, networks, and media for transferring data streams between a mobile device and a pressure/touch sensitive device through tactile input and/or vibrations can be used with a wide variety of non-financial transaction settings, such as social media, gaming, entertainment, information management, device synching and/or management, and a variety of other applications.

FIG. 1 depicts a diagram illustrating a representative payment network 100 according to an illustrative embodiment of the disclosed subject matter. Payment network 100 can allow for payment transactions in which merchants and card issuers do not necessarily have a one-to-one relationship. The payment network 100, for example and without limitation, can be a credit card payment system, which can utilize an electronic payment network 140, such as the MasterCard® payment card system interchange network. MasterCard® payment card system interchange network is a proprietary communications standard promulgated by MasterCard International Incorporated® based on the ISO 8583 message format for the exchange of financial transaction data between financial institutions that are customers of MasterCard International Incorporated. (MasterCard is a registered trademark of MasterCard International Incorporated located in Purchase, N.Y.). In some embodiments, the payment network 100, for example and without limitation, can include alternative payment networks including private, closed loop schemes, and block chain schemes.

As embodied herein, the payment network 100 for performing a POS transaction through vibrational and/or tactile input can include at least one merchant 110 connected to at least one electronic payment network 140, either directly or through an acquirer 120 via connection 115. At least one acquirer 140 can be connected to the electronic network 140, and each merchant 110 can be in communication with at least one acquirer 120 via the at least one payment network 140 or connection 115. At least one issuer 130 can be connected to the electronic network 140, and each acquirer 120 can be in communication with at least one issuer 130 via the electronic payment network 140.

For purpose of illustration and not limitation, in payment network 100, a financial institution, such as an issuer 130, can issue an account, such as a credit card account or a debit card account, to a cardholder (e.g., an individual consumer or a corporate or commercial customer), who can use the payment account card to tender payment for a purchase from a merchant 110 or to conduct a transaction at an ATM or website. To accept payment with the payment account card, merchant 110 can establish an account with a financial institution that is part of the financial payment system. This financial institution can be referred to as the "merchant bank" or the "acquiring bank," or herein as "acquirer 120." When a cardholder tenders payment for a purchase with a payment account card, the merchant, ATM, or website 110 can request authorization from acquirer 120 for the amount of the purchase. The request can be performed over the telephone, online via a website, or through the use of a point-of-sale terminal which can read the cardholder's account information from the magnetic stripe on the payment account card, from a smart card using contact pads, or contactlessly from a near-field communication (NFC) device and communicate electronically with the transaction processing computers of acquirer 120. Alternatively, acquirer 120 can authorize a third party to perform transaction processing on its behalf. In this case, the point-of-sale terminal can be configured to communicate with the third party. Such a third party can be referred to as a "merchant processor" or an "acquiring processor."

As embodied herein, using payment network 140, the computers of acquirer 120 or the merchant processor can communicate information regarding payment card transactions with computers of the issuer 130. For example and not limitation, information regarding payment card transactions can include an authorization request 125 and an authorization response 135. An authorization request 125 can be communicated from the computers of the acquirer 120 to the computers of issuer 130 to determine whether the cardholder's account is in good standing and whether the purchase is covered by the cardholder's available credit line or account balance. Based on these determinations, the authorization request 125 can be declined or accepted, and an authorization response 135 can be transmitted from the issuer 130 to the acquirer 120, and then to the merchant, ATM, or website 110. The authorization request 125 can include account information identifying the merchant, location information (e.g., an address of the merchant), and transaction information, as discussed herein. The authorization response 135 can include, among other things, a result of the determination that the transaction is approved or declined and/or information about the status of the payment card or payment account.

For example and not limitation, at least one payment network server 150 can be connected to the electronic payment network 140 and configured to automatically capture the data representing a plurality of variables related to payment card transactions from the electronic payment network 140. Additionally, the payment network server can be connected to a system 200 for predicting acceptance of a commercial card product either by the electronic payment network 140 or a separate connection 155. As embodied herein, the payment network server 150 can be configured to only capture the data representing a plurality of variables related to payment card transactions with the permission of the cardholder. Additionally, the payment network server 150 can be configured to only capture the information regarding payment card transactions in accordance with applicable data privacy laws.

FIG. 2 represents a diagram of a POS transaction system 200. The merchant terminal 202 can be an electronic device containing a pressure sensitive interface 206. In the embodiment illustrated FIG. 2, the merchant terminal 202 is a tablet computing device wherein the pressure sensitive interface 206 is a touch sensitive display screen that is capable of sensing different gradations of pressure sensitive inputs. In other embodiments, the merchant terminal 202 can be an ATM. The POS transaction system 200 can also include a mobile payment device 204. In the exemplary embodiment illustrated in FIG. 2, the mobile payment device 204 is a stylus having a haptic actuator 208 disposed at one end (e.g., at the edge of a surface of the mobile payment device 204's chassis) that is configured to generate tactile pulses and/or vibrations that can be transmitted through the edge, end or surface of the mobile payment device 204. In some embodiments, the mobile payment device 204 can communicate with remote servers (e.g., MasterCard servers). and can obtain financial information for its user (e.g., digital wallet data) when the mobile payment device 204 is registered to the user. In another embodiment, the mobile payment device 204 can communicate with remote servers indirectly through connections to other connected systems and/or through connections to physical storage devices (e.g., removable memory). The mobile payment device 204 can be equipped with sensors that can monitor when the mobile payment device 204 is within a predetermined distance from a merchant terminal 204. For example, the sensors can be Bluetooth sensors that detect the presence of a Bluetooth enabled payment terminal. Additionally or alternatively, the sensor can be a proximity sensor that detects the presence of an electronic device. The mobile payment device 204's sensors can be one or more of piezoelectric sensors, capacitive sensors, capacitive displacement sensor, Eddy-current sensors, inductive sensors, magnetic sensors, passive optical sensors (e.g., charge-coupled devices), passive thermal infrared sensors, photocells, fiber optics sensors, Hall effect sensors, etc. For purposes of illustration and not limitation, the predetermined distance can be preprogrammed into the processor of the mobile payment device 204 such that the mobile payment device 204 uses its sensors to detect when a merchant terminal 202 is within that predetermined distance from the mobile payment device 204 in order to facilitate stable communications between the mobile payment device 204 and the merchant terminal 204.

In some embodiments, once the mobile payment device 204 detects that it is within the predetermined distance away from the merchant terminal, the mobile payment device 204 can initiate the POS transaction. In other embodiments, the mobile payment device 204 can initiate the POS transaction upon user command without detecting proximity to the merchant terminal. For example, once the user of the mobile payment device presses a button and/or initiates a command on the mobile payment device to commence the POS transaction, the mobile payment device can identify the user's digital wallet information stored and/or accessible to the mobile payment device 204 and generate a series of pulses for the haptic actuator of the mobile device. The processor of the mobile payment device 204 can convert digital wallet information (e.g., payment card information, user identification information, authentication information, token information, and reward information) into a data format expected by the touch and/or pressure sensitive reader of the merchant terminal 202. The mobile payment device 204's processor can then instruct the haptic actuator 208 to convert these pulses into tactile pulses for vibrational output. Once the mobile payment device 204 comes into contact with and/or within a predetermined distance of the touch and/or pressure sensitive interface 206 of the merchant terminal 202, the mobile payment device 204's actuator 208 can produce the tactile pulses. The touch and/or pressure sensitive reader of the merchant terminal 202 can be configured to interpret the tactile pulses and convert them back into digital wallet information it needs to conduct the POS transaction.

In some embodiments, the mobile payment device 204 can receive a message, from the merchant terminal 202, indicating that the touch input is too noisy to be interpreted or that the formatting of the touch input is invalid (e.g., the merchant terminal 202 is not able to decipher the touch input's formatting due to noise). For example, a preset noise threshold can be established to maintain signal fidelity of the tactile pulses to distinguish them from ambient vibrations and/or noise. Additionally or alternatively, such a message can indicate that the merchant terminal 202 has received an improperly encoded message from the mobile payment device 204. In such an event, the processor can perform one of several different signal correction techniques based on the feedback and/or lack of feedback from the merchant terminal 202, from the user and/or from a remote source and/or server. In one exemplary implementation, the processor can instruct the haptic actuator 208 of the mobile payment device 204 to generate the plurality of tactile pulses having a higher pressure amplitude than tactile pulses previously transmitted to the merchant terminal. In another exemplary implementation, the processor can instruct the haptic actuator 208 of the mobile payment device 204 to retransmit the plurality of tactile pulses that were previously transmitted to the merchant terminal 202 until the pulses are successfully received at the merchant terminal 202. The processor can instruct the haptic actuator 208 to attempt retransmissions up to a predetermined maximum number of retransmission attempts. The processor can attempt to retransmit until that predetermined maximum number is achieved unless a terminal signal is received from the merchant terminal 202 and/or another remote source and/or server and/or the user instructs the mobile payment device 204 to terminate retransmitting pulses (e.g., by turning off the mobile payment device 204). In another exemplary implementation, the processor can instruct the haptic actuator 208 to generate the plurality of tactile pulses having a different pulse rate than that of the tactile pulses previously transmitted to the merchant terminal. In another exemplary implementation, the processor can instruct the haptic actuator to generate the plurality of tactile pulses having a different pulse format and/or gradations than that of the tactile pulses previously transmitted to the merchant terminal.

In some embodiments, the mobile payment device 204 can receive a message, from the merchant terminal 202, indicating a successful transmission of the tactile pulses and/or vibrational output from the mobile payment device 204.

In some embodiments, once the mobile payment device 204 detects that it is within the predetermined distance from the merchant terminal, the mobile payment device 204 can check whether the merchant terminal 204 is configured to accept touch sensitive and/or pressure sensitive inputs 204. The mobile payment device 204 can be able to access a registry of supported terminal capabilities that can be referenced if the type of terminal that the merchant terminal 204 can be determined, either by and/or on behalf of the mobile payment device 204. If the mobile payment device 204 determines that the merchant terminal 202 does not include a pressure sensitive reader but instead includes a magnetic stripe reader, the mobile payment device 204 can act as a magnetic emulator and transmit payment card information to the merchant terminal 204 in electromagnetic pulses through magnetic stripe induction. For example, the processor of the mobile payment device 204 can use the digital wallet information to generate electromagnetic pulses corresponding to the payment card information encoded in magnetic tracks of a traditional payment card expected by the magnetic stripe reader. The processor of the mobile payment device 204 can instruct a transmitter of the mobile payment device 204 to transmit the electromagnetic pulses to the magnetic stripe reader of the merchant terminal 202. The mobile payment device 204 can perform a similar check for other supported input devices (e.g., NFC readers) at the merchant terminal 202 and initiate a communication protocol between the input device found at the merchant terminal 202 accordingly based on the type of supported input device detected at the merchant terminal 202.

For purposes of illustration and not limitation, the mobile payment device 204 can check whether the merchant terminal 202 does not include a pressure sensitive reader but instead includes a magnetic stripe reader according to several different techniques. For example, the mobile payment device 204 can monitor whether it receives, within a predetermined amount of time of being within the predetermined distance of the merchant terminal 202 and transmitting a query message to the merchant terminal 202, a first electronic message from the merchant terminal 202 indicating that the merchant terminal 202 includes the magnetic stripe reader. Upon sending a query message to the merchant terminal 202, the mobile payment device 202 can monitor for a second electronic message from the merchant terminal 202 indicating the presence of the pressure sensitive reader in the merchant terminal 202. If the mobile payment device 204 does not receive a second electronic message indicating a presence of the pressure sensitive reader from the merchant terminal 202 within the predetermined amount of time from the time it sends the query, it can determine that a pressure sensitive device is not available at the merchant terminal 202 and proceed with magnetic emulation and communicate with the magnetic stripe reader through magnetic stripe induction. Additionally or alternatively, the mobile payment device 204 can receive an indication from the user of the mobile payment device that the merchant terminal includes the magnetic stripe reader and does not include the pressure sensitive reader. Additionally or alternatively, the mobile payment device 204 can determine that the merchant terminal includes the magnetic stripe reader and does not include the pressure sensitive reader by processing an image of the merchant terminal captured by an image capture device associated with the mobile payment device. The image capture device can include an image of the merchant terminal 202. The mobile payment device 204 can identify the presence or lack of presence of a pressure sensitive device and/or a magnetic stripe reader.

FIG. 3 depicts a block diagram illustrating a representative system 300 for performing a POS transaction according to an illustrative embodiment of the disclosed subject matter. The exemplary system 300 can include at least a mobile payment device 302, a merchant terminal 304, and a remote server 306, which can all communicate with each other over network 308. Network 308 can be a wireless network, local area network, the world wide web, or any other suitable network.

As embodied herein, the mobile payment device 302 can include a processor 310, a haptic processor 314, a secure element 312, a haptic actuator 316, user digital wallet data 318, and an electromagnetic pulse transmitter 320. The processor 310 performs all the tasks described throughout this disclosure associated with the mobile payment device's processor. The haptic processor 314, which can be included as a part of the processor 310 or can be a separate processor, can convert pulses encoding digital wallet information into tactile pulses for vibrational output through the haptic actuator 316 to the pressure and/or touch sensitive interface 322 of the merchant terminal 304. For example, processor 310 can determine a data format of the tactile pulses that the merchant terminal expects to receive and can instruct the haptic actuator 316 to generate tactile pulses according to the determined data format using the digital wallet data 318. For purposes of illustration and not limitation, the data format of the tactile pulses that the merchant terminal expects to receive can include binary data, hexadecimal data, octal data, binary-coded hexadecimal data, and binary-coded decimal data. The amplitude of each tactile pulse generated by the haptic actuator 316 can be determined based on the data format of the tactile pulses that the merchant terminal expects to receive. The secure element 312, working in conjunction with the processor 310, can process (e.g., tokenize, encrypt, and/or authenticate) transaction information exchanged between the mobile payment device 302 and the merchant terminal 304. The mobile payment device 302 can retrieve user digital wallet data 318 from user wallet data 334 stored in remote server 306 when the mobile payment device 302 is registered with the user and/or when the user manually inputs such information into the mobile payment device 302. The electromagnetic (EM) pulse transmitter 320 can be instructed by the processor 310 to produce EM pulses formatted to mimic payment card information (e.g., information encoded in the magnetic tracks of a user payment card) and a magnetic field when the mobile payment device 302 is in close proximity to the merchant terminal 304's magnetic stripe reader 328 to emulate magnetic payment card swipe at the magnetic swipe reader 328.

As embodied herein, the merchant terminal 304 can include a pressure and/or touch sensitive interface 322, a tactile input conversion engine 324, a processor 326, and a magnetic stripe reader 328. The pressure and/or touch sensitive interface 322 can be configured to accept different levels (e.g., distinguish different amplitudes) of pressure sensitive inputs. Additionally or alternatively, the pressure and/or touch sensitive interface 322 can be configured to only accept a binary touch sensitive input (e.g., detect the presence or lack of a tactile pulse input). The tactile input conversion engine 324 can interpret the tactile inputs received from the mobile payment device 302, received at the pressure and/or touch sensitive interface 322, and convert them into payment card data required to process the POS transaction at the merchant terminal 304. For example, the tactile input conversion engine 324 can be configured to process the tactile inputs according to the data format in which the haptic actuator 316 encodes the payment data to extract the payment card data.

As embodied herein, the remote server 306 (e.g., remote MasterCard server) can include user digital wallet data 334 and a POS transaction validation engine 336. Remote server 306 can maintain databases containing digital wallet information (e.g., payment card information, user identification information, authentication information, and reward information) of each of its payment card users. The POS transaction validation engine 336 can be configured to validate a transaction upon receiving authentication information (e.g., tokens, cryptograms, etc.) from the mobile payment device 302 directly, or indirectly via the merchant terminal 304 encoded in a different software layer than the payment card data for the POS transaction.

FIG. 4 is a flow chart illustrating a representative method 400 implemented according to an illustrative embodiment of the disclosed subject matter. The exemplary network 100 of FIG. 1, system 200 of FIG. 2, and system 300 of FIG. 3, for purpose of illustration and not limitation, are discussed with reference to the exemplary method of FIG. 4.

As embodied herein, at 401, the mobile payment device can identify properties associated with the merchant terminal. For example, the mobile payment device can determine the terminal type of the merchant terminal and/or the format of data accepted by the merchant terminal.

At 402, the mobile payment device can determine that it is within a predetermined distance of the merchant terminal. For example, predetermined distance can be preprogrammed into the processor of the mobile payment device 204. The mobile payment device 204 can use its sensors to detect when a merchant terminal 202 is within that predetermined distance from the mobile payment device 204 in order to facilitate stable communications between the mobile payment device 204 and the merchant terminal 204.

At 404, the mobile payment device can obtain digital wallet information associated with a user of the mobile payment device. For example, the mobile payment device can communicate with the remote server 306 to obtain digital wallet information 334 associated with the user upon user registration at the mobile payment device 302. Additionally or alternatively, the user can manually enter such digital wallet information at the mobile payment device upon user registration, which can be stored in the mobile payment device (e.g., user digital wallet data 318).

At 406, the mobile payment device can generate pulses encoding payment card information expected by the merchant terminal. For example, the mobile payment device can determine a data format of the tactile pulses that the merchant terminal expects to receive. Accordingly, the mobile payment device can generate pulses according to the determined data format from the digital wallet information. The data format of the tactile pulses that the merchant terminal expects to receive can include binary data, hexadecimal data, octal data, binary-coded hexadecimal data, binary-coded decimal data. The amplitude of each tactile pulse can be determined based on the data format of the tactile pulses that the merchant terminal expects to receive.

At 408, the mobile payment device can instruct the haptic actuator to generate tactile pulses corresponding to the pulses generated in step 406. For example, the haptic actuator can be instructed to output tactile pulses corresponding to the pulses calculated by the processor of the mobile payment device in step 406 at a certain amplitude.

At 409, the mobile payment device can receive feedback from the merchant terminal. For example, the mobile payment device 204 can receive a message from the merchant terminal 202 indicating successful receipt of the tactile pulses. Alternatively, the mobile payment device 204 can receive a message from the merchant terminal 202 indicating that the tactile pulses were improperly encoded (e.g., in an incompatible format from the format used at the merchant terminal 202) and/or that the tactile pulses were too noisy.

At 410, the mobile payment device can determine whether at least one tactile pulse received by the merchant terminal falls below the predetermined noise threshold. For example, the mobile payment device 204 can receive a message, from the merchant terminal 202, indicating that the touch input is too noisy to be interpreted correctly. A preset noise threshold can be established to maintain signal fidelity of the tactile pulses to distinguish them from ambient vibrations and/or noise.

At 412, in response to determining at step 410 that at least one tactile pulse received by the merchant terminal falls below the predetermined noise threshold, the mobile payment device can instruct the haptic actuator to generate tactile pulses having a higher pressure amplitude than the tactile pulses previously transmitted to the merchant terminal. For example, the mobile payment device's processor can instruct the haptic actuator 208 to increase the amplitude of the tactile pulses by a preset amount.

At 414, in response to determining at step 410 that no tactile pulses received by the merchant terminal fall below the predetermined noise threshold, the mobile payment device can instruct the merchant terminal to convert tactile pulses into payment information for processing the POS transaction. The mobile payment device can further instruct the merchant terminal to transmit a message to the issuer of the payment card to authenticate the POS transaction. For example, the mobile payment device can encode authentication information, token information, and other security information on a different software layer than the payment card information expected by the merchant terminal. The processor of the mobile payment device can instruct the merchant terminal to convert the plurality of tactile pulses received from the mobile payment device into decoded payment information for processing the point of sale transaction and a message comprising the authentication information, token information, and other security information received on a different software layer than the payment card information. The processor of the mobile payment device can further instruct the merchant terminal to transmit the message, containing the authentication information, token information, and other security information presented on a different software layer than the payment card information, to the issuer of the payment card to authenticate the point of sale transaction.

Figure 5:
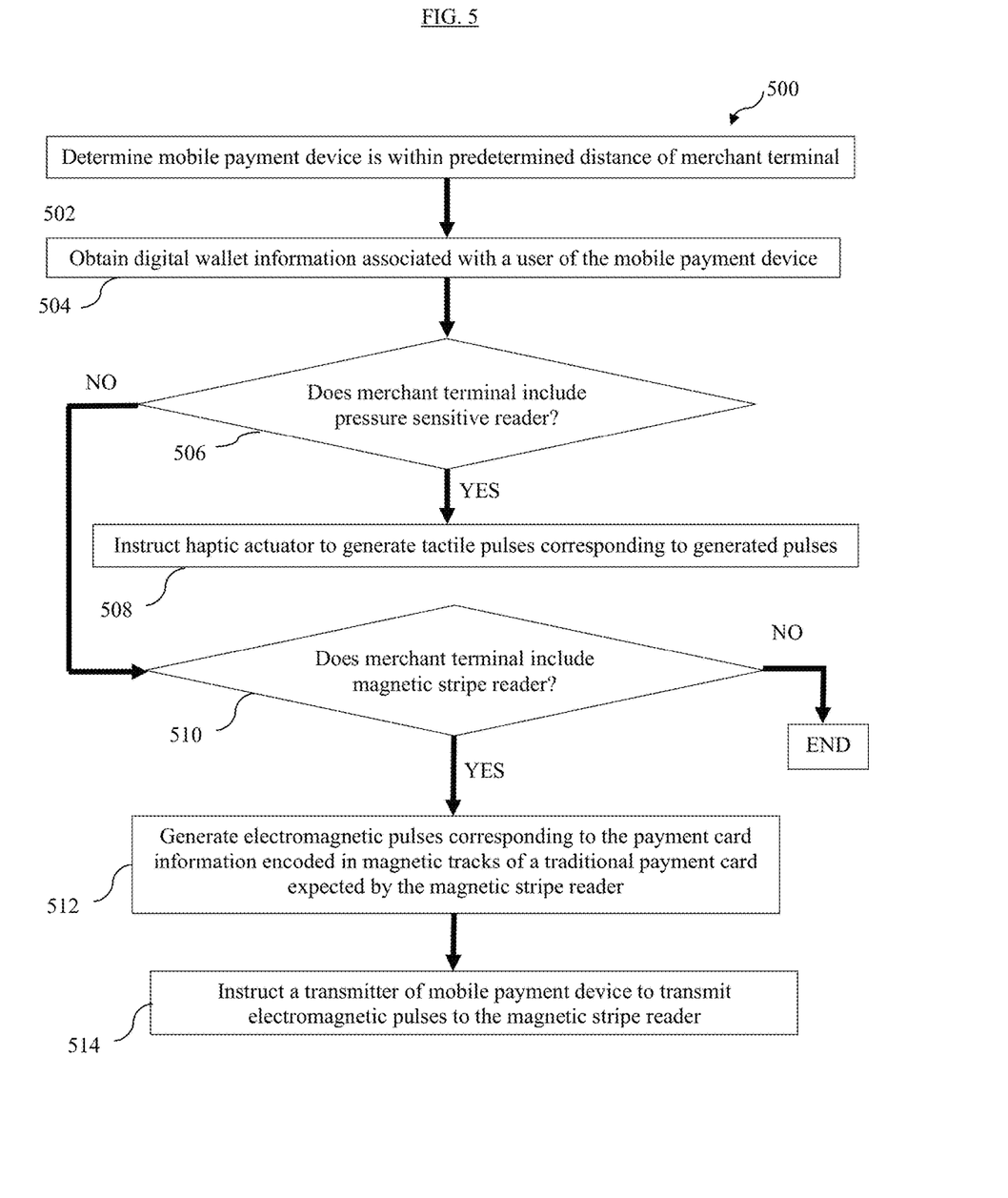
FIG. 5 is a flow chart illustrating a representative method, for transferring data through magnetic induction when a pressure sensitive device is not available, implemented according to an illustrative embodiment of the disclosed subject matter.

FIG. 5 is a flow chart illustrating a representative method 400 implemented according to an illustrative embodiment of the disclosed subject matter. The exemplary network 100 of FIG. 1, system 200 of FIG. 2, and system 300 of FIG. 3, for purpose of illustration and not limitation, are discussed with reference to the exemplary method of FIG. 5.

As embodied herein, at 502, the mobile payment device can determine that it is within a predetermined distance of the merchant terminal. For example, predetermined distance can be preprogrammed into the processor of the mobile payment device 204. The mobile payment device 204 can use its sensors to detect when a merchant terminal 202 is within that predetermined distance from the mobile payment device 204 in order to facilitate stable communications between the mobile payment device 204 and the merchant terminal 204.

At 504, the mobile payment device can obtain digital wallet information associated with a user of the mobile payment device. For example, the mobile payment device can communicate with the remote server 306 to obtain digital wallet information 334 associated with the user upon user registration at the mobile payment device 302. Additionally or alternatively, the user can manually enter such digital wallet information at the mobile payment device upon user registration, which can be stored in the mobile payment device (e.g., user digital wallet data 318).

At 506, the mobile payment device can determine whether the merchant terminal includes a pressure and/or touch sensitive reader. For example, upon sending a query message to the merchant terminal 202, the mobile payment device 202 can monitor for an electronic message from the merchant terminal 202 indicating the presence of the pressure sensitive reader in the merchant terminal 202. If the mobile payment device 204 does not receive a second electronic message indicating a presence of the pressure sensitive reader from the merchant terminal 202 within the predetermined amount of time from the time it sends the query, it can determine that a pressure sensitive device is not available at the merchant terminal 202. Additionally or alternatively, the mobile payment device 204 can receive an indication from the user of the mobile payment device that the merchant terminal does not include the pressure sensitive reader. Additionally or alternatively, the mobile payment device 204 can determine whether the merchant terminal includes the pressure sensitive reader by processing an image of the merchant terminal captured by an image capture device associated with the mobile payment device. The image capture device can include an image of the merchant terminal 202. The mobile payment device 204 can identify the presence or lack of presence of a pressure sensitive device.

At 508, in response to determining that the merchant terminal includes a pressure and/or touch sensitive reader, the mobile payment device can instruct the haptic actuator to generate tactile pulses corresponding to the pulses generated, as described in step 406 of FIG. 4.

At 510, in response to determining that the merchant terminal does not include a pressure and/or touch sensitive reader, the mobile payment device can determine whether the merchant terminal includes a magnetic stripe reader using any of the processes described in step 506 for checking the presence of a pressure sensitive reader at the merchant terminal.

At 512, in response to determining that the merchant terminal includes a magnetic stripe reader, the mobile payment device can generate electromagnetic pulses corresponding to the payment card information encoded in the magnetic tracks of a traditional payment card expected by the magnetic stripe reader. For example, the processor of the mobile payment device 204 can use the digital wallet information to generate electromagnetic pulses corresponding to the payment card information encoded in magnetic tracks of a traditional payment card expected by the magnetic stripe reader.

At 514, the mobile payment device can instruct a transmitter of the mobile payment device to transmit electromagnetic pulses to the magnetic stripe reader. For example, the processor of the mobile payment device 204 can instruct a transmitter of the mobile payment device 204 to transmit the electromagnetic pulses to the magnetic stripe reader of the merchant terminal 202.

FIG. 6 is a block diagram illustrating further details of a representative computer system according to an illustrative embodiment of the disclosed subject matter.

The systems and techniques discussed herein can be implemented in a computer system. As an example and not by limitation, as shown in FIG. 4, the computer system having architecture 600 can provide functionality as a result of processor(s) 601 executing software embodied in one or more tangible, non-transitory computer-readable media, such as memory 603. The software implementing various embodiments of the present disclosure can be stored in memory 603 and executed by processor(s) 601. A computer-readable medium can include one or more memory devices, according to particular needs. Memory 603 can read the software from one or more other computer-readable media, such as mass storage device(s) 635 or from one or more other sources via communication interface 620. The software can cause processor(s) 601 to execute particular processes or particular parts of particular processes described herein, including defining data structures stored in memory 603 and modifying such data structures according to the processes defined by the software. An exemplary input device 633 can be, for example, a keyboard, a pointing device (e.g. a mouse), a touchscreen display, a microphone and voice control interface, a pressure sensor or the like to capture user input coupled to the input interface 623 to provide data and/or user input to the processor 601. An exemplary output device 634 can be, for example, a display (e.g. a monitor) or speakers or a haptic device coupled to the output interface 624 to allow the processor 601 to present a user interface, visual content, and/or audio content. Additionally or alternatively, the computer system 600 can provide an indication to the user by sending text or graphical data to a display 632 coupled to a video interface 622. Furthermore, any of the above components can provide data to or receive data from the processor 601 via a computer network 630 coupled the communication interface 620 of the computer system 600. In addition or as an alternative, the computer system can provide functionality as a result of logic hardwired or otherwise embodied in a circuit, which can operate in place of or together with software to execute particular processes or particular parts of particular processes described herein. Reference to software or executable instructions can encompass logic, and vice versa, where appropriate. Reference to a computer-readable media can encompass a circuit (such as an integrated circuit (IC)) storing software or executable instructions for execution, a circuit embodying logic for execution, or both, where appropriate. The present disclosure encompasses any suitable combination of hardware and software.

In some embodiments, processor 601 includes hardware for executing instructions, such as those making up a computer program. As an example and not by way of limitation, to execute instructions, processor 601 can retrieve (or fetch) the instructions from an internal register, an internal cache 602, memory 603, or storage 608; decode and execute them; and then write one or more results to an internal register, an internal cache 602, memory 603, or storage 608. In particular embodiments, processor 601 can include one or more internal caches 602 for data, instructions, or addresses. This disclosure contemplates processor 601 including any suitable number of any suitable internal caches, where appropriate. As an example and not by way of limitation, processor 601 can include one or more instruction caches 602, one or more data caches 602, and one or more translation lookaside buffers (TLBs). Instructions in the instruction caches 602 can be copies of instructions in memory 603 or storage 608, and the instruction caches 602 can speed up retrieval of those instructions by processor 601. Data in the data caches 602 can be copies of data in memory 603 or storage 608 for instructions executing at processor 601 to operate on; the results of previous instructions executed at processor 601 for access by subsequent instructions executing at processor 601 or for writing to memory 603 or storage 608; or other suitable data. The data caches 602 can speed up read or write operations by processor 601. The TLBs can speed up virtual-address translation for processor 601. In some embodiments, processor 601 can include one or more internal registers for data, instructions, or addresses. This disclosure contemplates processor 601 including any suitable number of any suitable internal registers, where appropriate. Where appropriate, processor 601 can include one or more arithmetic logic units (ALUs); be a multi-core processor; or include one or more processors 601. Although this disclosure describes and illustrates a particular processor, this disclosure contemplates any suitable processor.

In some embodiments, memory 603 includes main memory for storing instructions for processor 601 to execute or data for processor 601 to operate on. As an example and not by way of limitation, computer system 600 can load instructions from storage 608 or another source (such as, for example, another computer system 600) to memory 603. Processor 601 can then load the instructions from memory 603 to an internal register or internal cache 602. To execute the instructions, processor 601 can retrieve the instructions from the internal register or internal cache 602 and decode them. During or after execution of the instructions, processor 601 can write one or more results (which can be intermediate or final results) to the internal register or internal cache 602. Processor 601 can then write one or more of those results to memory 603. In some embodiments, processor 601 executes only instructions in one or more internal registers or internal caches 602 or in memory 603 (as opposed to storage 608 or elsewhere) and operates only on data in one or more internal registers or internal caches or in memory 603 (as opposed to storage 608 or elsewhere). One or more memory buses (which can each include an address bus and a data bus) can couple processor 601 to memory 603. Bus 640 can include one or more memory buses, as described below. In particular embodiments, one or more memory management units (MMUs) reside between processor 601 and memory 603 and facilitate accesses to memory 603 requested by processor 601. In some embodiments, memory 603 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 603 can include one or more memories 604, where appropriate. Although this disclosure describes and illustrates particular memory, this disclosure contemplates any suitable memory.

In some embodiments, storage 608 includes mass storage for data or instructions. As an example and not by way of limitation, storage 608 can include a hard disk drive (HDD), a floppy disk drive, flash memory, an optical disc, a magneto-optical disc, magnetic tape, or a Universal Serial Bus (USB) drive or a combination of two or more of these. Storage 608 can include removable or non-removable (or fixed) media, where appropriate. Storage 608 can be internal or external to computer system 600, where appropriate. In some embodiments, storage 608 is non-volatile, solid-state memory. In some embodiments, storage 608 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. Storage 608 can include one or more storage control units facilitating communication between processor 601 and storage 608, where appropriate. Where appropriate, storage 608 can include one or more storages 608. Although this disclosure describes and illustrates particular storage, this disclosure contemplates any suitable storage.

In some embodiments, input interface 623 and output interface 624 can include hardware, software, or both, providing one or more interfaces for communication between computer system 600 and one or more input device(s) 633 and/or output device(s) 634. Computer system 600 can include one or more of these input device(s) 633 and/or output device(s) 634, where appropriate. One or more of these input device(s) 633 and/or output device(s) 634 can enable communication between a person and computer system 600. As an example and not by way of limitation, an input device 633 and/or output device 634 can include a keyboard, keypad, microphone, monitor, mouse, printer, scanner, speaker, still camera, stylus, tablet, touch screen, trackball, video camera, another suitable input device 633 and/or output device 634 or a combination of two or more of these. An input device 633 and/or output device 634 can include one or more sensors. This disclosure contemplates any suitable input device(s) 633 and/or output device(s) 634 and any suitable input interface 623 and output interface 624 for them. Where appropriate, input interface 623 and output interface 624 can include one or more device or software drivers enabling processor 601 to drive one or more of these input device(s) 633 and/or output device(s) 634. Input interface 623 and output interface 624 can include one or more input interfaces 623 or output interfaces 624, where appropriate. Although this disclosure describes and illustrates a particular input interface 623 and output interface 624, this disclosure contemplates any suitable input interface 623 and output interface 624.

As embodied herein, communication interface 620 can include hardware, software, or both providing one or more interfaces for communication (such as, for example, packet-based communication) between computer system 600 and one or more other computer systems 600 or one or more networks. As an example and not by way of limitation, communication interface 620 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 620 for it. As an example and not by way of limitation, computer system 600 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 600 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 can include any suitable communication interface 620 for any of these networks, where appropriate. Communication interface 620 can include one or more communication interfaces 620, where appropriate. Although this disclosure describes and illustrates a particular communication interface, this disclosure contemplates any suitable communication interface.

In some embodiments, bus 640 includes hardware, software, or both coupling components of computer system 600 to each other. As an example and not by way of limitation, bus 640 can include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 640 can include one or more buses 604, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within its spirit and scope.

The invention claimed is:

1. A method for performing a point of sale transaction, comprising:
    determining, by a processor of a mobile payment device, that the mobile payment device is within a predetermined distance of a merchant terminal;
    obtaining, by the processor of the mobile payment device, digital wallet information associated with a user of the mobile payment device;
    generating, by the processor of the mobile payment device, a plurality of pulses from the digital wallet information, wherein the plurality of pulses encodes payment card information expected by the merchant terminal for the point of sale transaction; and
    instructing, by the processor of the mobile payment device, a haptic actuator of the mobile payment device to generate a plurality of tactile pulses, wherein each tactile pulse of the plurality of tactile pulses corresponds to a pulse of the plurality of pulses.

2. The method of claim 1, wherein the digital wallet information comprises payment card information, user identification information, authentication information, token information, and reward information.

3. The method of claim 1, wherein generating the plurality of pulses further comprises:
    determining, by the processor of the mobile payment device, a data format of the tactile pulses that the merchant terminal expects to receive, wherein the merchant terminal is configured to convert the tactile pulses output by the haptic actuator of the mobile payment device into digital wallet information; and
    generating, by the processor of the mobile payment device, the plurality of pulses according to the determined data format from the digital wallet information.

4. The method of claim 3, wherein the data format of the tactile pulses that the merchant terminal expects to receive is selected from the group comprising of binary data, hexadecimal data, octal data, binary-coded hexadecimal data, binary-coded decimal data or another data format, and wherein an amplitude of each tactile pulse in the plurality of tactile pulses is determined based on the data format of the tactile pulses that the merchant terminal expects to receive.

5. The method of claim 1, wherein the mobile payment device comprises one or more sensors configured to determine when the mobile payment device is within the predetermined distance of the merchant terminal, and wherein the haptic actuator generates vibration transmitted at an edge of a surface of the mobile payment device.

6. The method of claim 1, further comprising:
    receiving, by the processor of the mobile payment device and from the merchant terminal, a message indicating that at least one tactile pulse of the plurality of tactile pulses received by the merchant terminal falls below a predetermined noise threshold or message structure is otherwise invalid;
    instructing, by the processor of the mobile payment device, the haptic actuator of the mobile payment device to generate the plurality of tactile pulses which can have a higher pressure amplitude and/or different format than tactile pulses previously transmitted to the merchant terminal.

7. The method of claim 1, further comprising:
    determining that the merchant terminal does not include a pressure sensitive reader and includes a magnetic stripe reader;
    generating, by the processor of the mobile payment device using the digital wallet information, electromagnetic pulses corresponding to the payment card information encoded in magnetic tracks of a traditional payment card expected by the magnetic stripe reader;
    instructing, by the processor of the mobile payment device, a transmitter of the mobile payment device to transmit the electromagnetic pulses to the magnetic stripe reader.

8. The method of claim 7, wherein the determining that the merchant terminal does not include a pressure sensitive reader and includes a magnetic stripe reader further comprises at least one of:
    receiving within a predetermined amount of time, by the mobile payment device and from the merchant terminal, a first electronic message indicating that the merchant terminal includes the magnetic stripe reader and not receiving, within the predetermined amount of time, a second electronic message indicating a presence of the pressure sensitive reader;
    receiving an indication from the user of the mobile payment device that the merchant terminal includes the magnetic stripe reader and does not include the pressure sensitive reader; and
    determining, by the processor of the mobile payment device, that the merchant terminal includes the magnetic stripe reader and does not include the pressure sensitive reader by processing an image of the merchant terminal captured by an image capture device associated with the mobile payment device.

9. The method of claim 1, wherein the plurality of tactile pulses encodes authentication information, token information, and other security information on a different software layer than the payment card information expected by the merchant terminal.

10. The method of claim 9, wherein the merchant terminal is instructed by the processor of the mobile payment device to convert the plurality of tactile pulses received from the mobile payment device into decoded payment information for processing the point of sale transaction and a message comprising the authentication information, token information, and other security information received on a different software layer than the payment card information, and wherein the message is transmitted to an issuer of the payment card to authenticate the point of sale transaction.

11. A mobile apparatus for performing a point of sale transaction, comprising:
 a haptic actuator;
 a processor, coupled to the haptic actuator, and configured to:
  determine that the mobile apparatus is within a predetermined distance of a merchant terminal;
  obtain digital wallet information associated with a user of the mobile apparatus;
  generate a plurality of pulses from the digital wallet information, wherein the plurality of pulses encodes payment card information expected by the merchant terminal for the point of sale transaction; and
  instruct the haptic actuator to generate a plurality of tactile pulses, wherein each tactile pulse of the plurality of tactile pulses corresponds to a pulse of the plurality of pulses.

12. The mobile apparatus of claim 11, wherein the digital wallet information comprises payment card information, user identification information, authentication information, token information, and reward information.

13. The mobile apparatus of claim 11, wherein the processor is configured to generate the plurality of pulses by:
 determining a data format of the tactile pulses that the merchant terminal expects to receive, wherein the merchant terminal is configured to convert the tactile pulses output by the haptic actuator into digital wallet information; and
 generating the plurality of pulses according to the determined data format from the digital wallet information.

14. The mobile apparatus of claim 13, wherein the data format of the tactile pulses that the merchant terminal expects to receive is selected from the group comprising of binary data, hexadecimal data, octal data, binary-coded hexadecimal data, binary-coded decimal data, and wherein an amplitude of each tactile pulse in the plurality of tactile pulses is determined based on the data format of the tactile pulses that the merchant terminal expects to receive.

15. The mobile apparatus of claim 11, wherein the mobile apparatus comprises one or more sensors configured to determine when the mobile apparatus is within the predetermined distance of the merchant terminal, and wherein the haptic actuator is located at an edge of a surface of the mobile apparatus.

16. The mobile apparatus of claim 11, wherein the processor is further configured to:
 receive, from the merchant terminal, a message indicating that at least one tactile pulse of the plurality of tactile pulses received by the merchant terminal falls below a predetermined noise threshold;
 instruct the haptic actuator to generate the plurality of tactile pulses having a higher pressure amplitude than tactile pulses previously transmitted to the merchant terminal.

17. The mobile apparatus of claim 11, further comprising a transmitter, wherein the processor is further configured to:
 determine that the merchant terminal does not include a pressure sensitive reader and includes a magnetic stripe reader;
 generate, using the digital wallet information, electromagnetic pulses corresponding to the payment card information encoded in magnetic tracks of a traditional payment card expected by the magnetic stripe reader;
 instruct the transmitter to transmit the electromagnetic pulses to the magnetic stripe reader.

18. The mobile apparatus of claim 17, further comprising an image capture device, wherein the processor is configured to determine that the merchant terminal does not include a pressure sensitive reader and includes a magnetic stripe reader by performing at least one of:
 receiving within a predetermined amount of time, from the merchant terminal, a first electronic message indicating that the merchant terminal includes the magnetic stripe reader and not receiving, within the predetermined amount of time, a second electronic message indicating a presence of the pressure sensitive reader;
 receiving an indication from the user of the mobile apparatus that the merchant terminal includes the magnetic stripe reader and does not include the pressure sensitive reader; and
 determining that the merchant terminal includes the magnetic stripe reader and does not include the pressure sensitive reader by processing an image of the merchant terminal captured by the image capture device.

19. The mobile apparatus of claim 11, wherein the plurality of tactile pulses encodes authentication information, token information, and other security information on a different software layer than the payment card information expected by the merchant terminal.

20. The mobile apparatus of claim 19, wherein the merchant terminal is instructed by the processor to convert the plurality of tactile pulses received from the mobile apparatus into decoded payment information for processing the point of sale transaction and a message comprising the authentication information, token information, and other security information received on a different software layer than the payment card information, and wherein the message is transmitted to an issuer of the payment card to authenticate the point of sale transaction.

* * * * *